United States Patent
Weber

(10) Patent No.: US 7,516,760 B2
(45) Date of Patent: Apr. 14, 2009

(54) PISTON-TYPE ACCUMULATOR

(75) Inventor: Norbert Weber, Sulzbach (DE)

(73) Assignee: Hydac Technology GmbH, Sulzbach/Saar (DE)

( * ) Notice: Subject to any disclaimer, the term of this patent is extended or adjusted under 35 U.S.C. 154(b) by 0 days.

(21) Appl. No.: 10/584,929

(22) PCT Filed: Dec. 10, 2004

(86) PCT No.: PCT/EP2004/014051

§ 371 (c)(1),
(2), (4) Date: Apr. 15, 2008

(87) PCT Pub. No.: WO2005/068848

PCT Pub. Date: Jul. 28, 2005

(65) Prior Publication Data

US 2008/0230135 A1    Sep. 25, 2008

(30) Foreign Application Priority Data

Jan. 16, 2004    (DE) .................. 10 2004 002 266

(51) Int. Cl.
*F16L 55/04* (2006.01)
(52) U.S. Cl. .......................................... 138/31; 138/30
(58) Field of Classification Search .................. 138/31, 138/30, 26
See application file for complete search history.

(56) References Cited

U.S. PATENT DOCUMENTS

| 5,363,744 | A | * | 11/1994 | Pichler | 92/242 |
| 5,992,948 | A | * | 11/1999 | Gowda | 303/116.1 |
| 6,390,133 | B1 | * | 5/2002 | Patterson et al. | 138/31 |
| 6,539,976 | B1 | * | 4/2003 | Whiteside | 138/31 |
| 6,612,339 | B1 | * | 9/2003 | Wilke et al. | 138/31 |

FOREIGN PATENT DOCUMENTS

| EP | 0 261 293 | | 3/1988 |
| GB | 2341812 A | * | 3/2000 |
| JP | 2000-346002 | | 12/2000 |

\* cited by examiner

*Primary Examiner*—Patrick F Brinson
(74) *Attorney, Agent, or Firm*—Roylance, Abrams, Berdo & Goodman, L.L.P.

(57) ABSTRACT

A piston-type accumulator includes a separating piston (24) axially displaced inside an accumulator housing (10) and separating two spaces from one another inside the accumulator housing (10), particularly a gas side (22) from a liquid side (20) of the accumulator. Due to the fact that the separating piston (24) is predominantly or completely made of a plastic material, it can be provided with a very light weight reducing the overall installation weight of the piston-type accumulator.

13 Claims, 2 Drawing Sheets

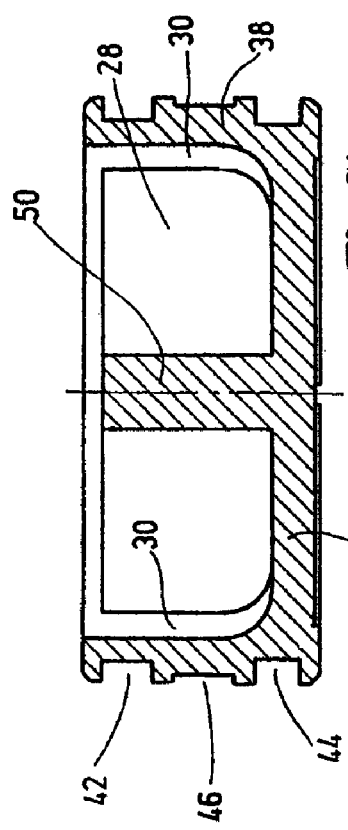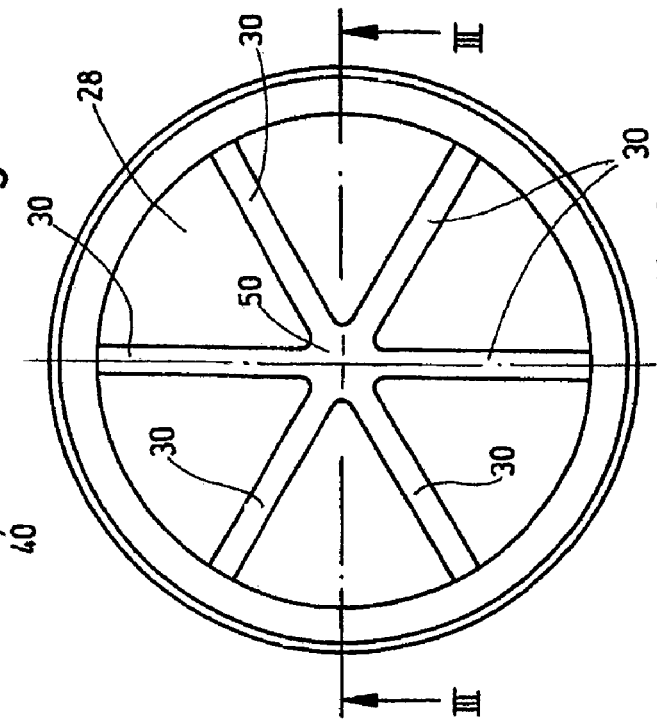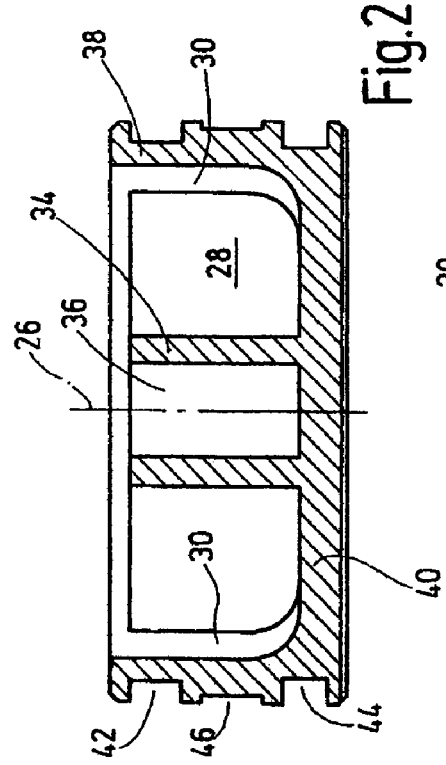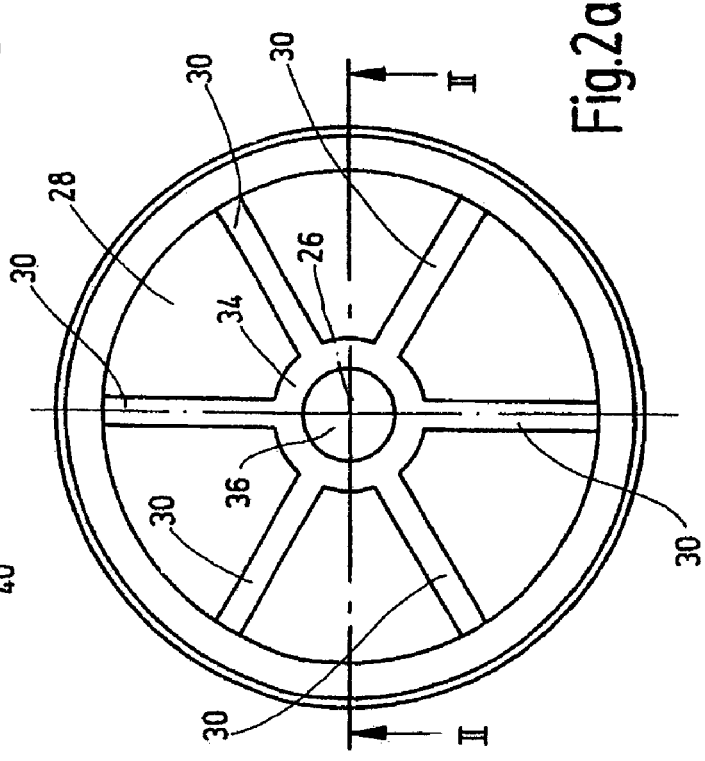

ced piston-type accumulator according to a first
PISTON-TYPE ACCUMULATOR

FIELD OF THE INVENTION

The present invention relates to a piston-type accumulator comprising a separating piston which is axially displaceable within the accumulator housing and which separates two spaces within the accumulator housing from each other, in particular the gas side from the fluid side of the accumulator.

BACKGROUND OF THE INVENTION

Piston-type accumulators with gas and fluid sides separated by an axially displaceable piston are known in a plurality of designs. The axially guiding part of the accumulator housing which surrounds the separating piston generally has the shape of a cylinder pipe. For this reason, piston-type accumulators are often called cylinder accumulators. The seal areas on the piston circumference are conventionally formed by ring seals or O-ring seals which are recessed into outer circumferential grooves offset axially to each other in the separating piston.

For use of these cylinder or piston-type accumulators high demands are imposed with respect to their operational reliability, especially over wide temperature ranges, for example, between −40° C. and +150° C. In a generic piston-type accumulator according to DE 101 39 192 A1, within the accumulator housing at a point located between the seal areas of the separating piston, a bleeding possibility has been created for drainage of leaking media passing through the seal areas. As a result of the bleeding possibility between the gas-side and fluid-side seal areas in the known solution, it is ensured that media cannot pass from the gas side to the fluid side or vice versa. In this manner, this piston-type accumulator retains its tightness even under extreme conditions and for long periods of use.

The separating piston formed of a steel material is large in its axial direction of motion within the accumulator housing, and can be considered heavy in terms of weight. As a result of the associated sluggish dynamic behavior of the piston-like separating element, the known hydraulic or piston-type accumulator is less suited for applications in which the separating piston must be moved in a rapid sequence, for example, in the cases in which on the fluid side high-frequency pressure pulses are delivered into the accumulator, and for those cases in which the piston-type accumulator is supposed to entail less weight, for example, in the areas of aeronautics and astronautics.

SUMMARY OF THE INVENTION

An object of the present invention is to provide improved piston-type accumulators, while retaining the advantages of such conventional accumulators, such that short trigger times are possible with the separating piston and an accumulator with little weight in use is implemented.

This object is basically achieved by a piston-type accumulator where the separating piston is largely or completely of a plastic material. In terms of its weight, it can be designed to be very light so that overall the installation weight of the piston-type accumulator is reduced. In this way, the piston-type accumulator of the present invention is then especially suited to use in the domains of aeronautics and astronautics and for other applications in which fundamentally weight is to be reduced. Since the separating piston, made at least partially of plastic material, has a low mass compared to the known steel pistons, it can be easily triggered and quickly reversed in the direction of motion so that when high frequency fluid pulsations are being delivered into the accumulator housing, the piston-type accumulator meets the associated requirements, especially with respect to smoothing of the pulsation flow and the like.

Preferably, at least parts of the interior of the separating piston are formed by injection molding or are obtained by an extrusion process. Toward the outside at least partially, a reinforcement of plastic fibers or a plastic membrane is applied. In this way, the basic structure of the separating piston can be achieved cost-effectively. The necessary mechanical strength properties for the separating piston can be obtained by the applied fiber or membrane laminate of plastic, even if the separating piston is to be exposed later to high frequency pulsations in its fluid operation.

In one especially preferred embodiment of the piston-type accumulator of the present invention, the separating piston is formed of glass fiber-reinforced polyaryl amide. The plastic material used for this purpose has essentially the same coefficient of thermal expansion as the steel used in the prior art for the separating piston and/or of the steel material for the accumulator housing, especially in the preferred temperature range from −40° C. to 120° C. In this respect, the same structural properties for the separating piston of the present invention are implemented as in the known solutions. In particular, the plastic separating piston has a stable shape so that it is ensured that the seal areas provided on the outer circumference of the separating piston between the separating piston and the inside of the accumulator housing do not change. The desired tight accumulator system is then implemented to a high degree with the piston-type accumulator of the present invention.

In another preferred embodiment of the piston-type accumulator of the present invention, the separating piston borders a cavity which is open preferably in the direction of the gas side of the accumulator housing. In this way, the volume of accumulator gas can be increased by using the cavity. For this purpose, the damping capacity of the piston-type accumulator of the present invention is improved.

In another especially preferred embodiment of the piston-type accumulator of the present invention, within the cavity, stiffening crosspieces, configured diametrically to the longitudinal axis of the accumulator housing, extend from this longitudinal axis to the cylindrical inside wall of the separating piston laterally bordering the cavity. In one modified embodiment, the ends of the stiffening crosspieces preferably facing away from the inside wall end in a cylindrical hollow receiving ring within the separating piston. Due to the stiffening crosspieces extending radially from the center of the separating piston to the outside, the sealing area is stiffened toward the inside wall of the accumulator housing relative to the separating piston, and the sealing elements provided on the outer circumference of the separating piston and optionally guide strips are kept in contact with the inside of the accumulator housing.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIGS. 2a and 2b are a top plan view and a side elevational view in section taken along line II-II of FIG. 2a, respectively, of the separating piston shown in FIG. 1; and FIGS. 3a and 3b are a top plan view and a side elevational view in section taken along line III-III of FIG. 3a, respectively, of a separating piston according to a second exemplary embodiment of the present invention that can be used in the accumulator of FIG. 1.

DETAILED DESCRIPTION OF THE INVENTION

Figure 1:
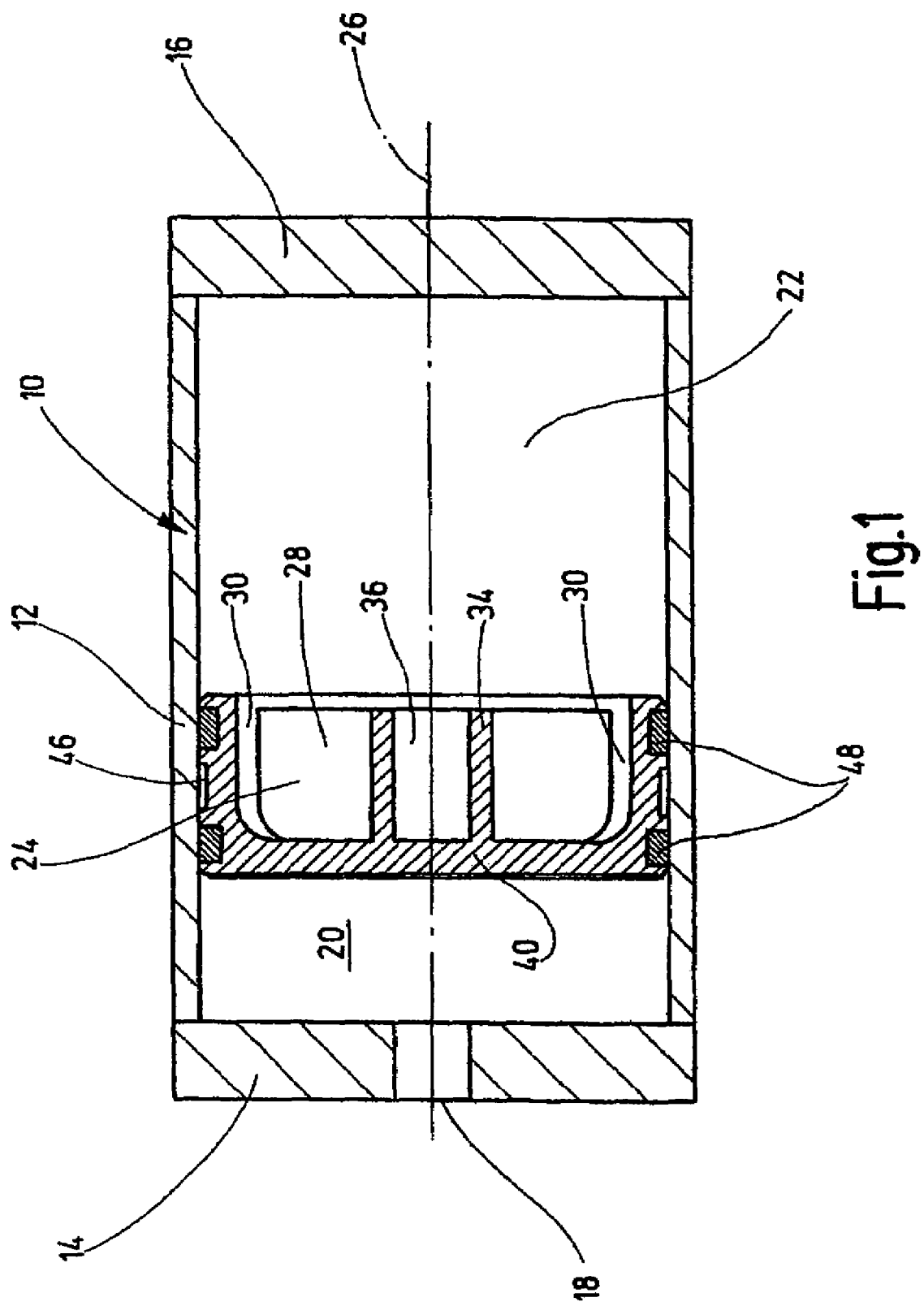
FIG. 1 is a schematic, not to scale, side elevational view in section of a piston-type accumulator according to a first exemplary embodiment of the present invention, with a separating piston axially displaceable within the accumulator housing.

The piston-type accumulator shown in FIG. 1 has an accumulator housing 10 with a cylindrical jacket or housing 12 (cylinder pipe) sealed on the end sides by two cover parts 14, 16. The cover part 14, the left one as viewed in FIG. 1, has a fluid connection 18 for connecting the separating piston to the piping or conduits of a hydraulic system (not shown), to carry fluid, in order in this way to connect the hydraulic system to the fluid side 20 of the separating piston. The cover part 16, the right one as viewed in FIG. 1, encloses a gas space 22, which can be filled, for example, with nitrogen gas, within the cylindrical jacket 12.

To refill the gas space 22, also called the gas side of the separating piston, a replenishing valve (not shown) located in the cover part 16 can be used. To separate the fluid side 20 from the gas side 22 within the accumulator housing 10 with its cylindrical jacket 12, a separating piston 24 is axially displaceable back and forth depending on the system state of the separating piston along its longitudinal axis 26. This structure of a separating piston is prior art so that it will not be detailed here.

In contrast to the known or conventional solutions in which the separating piston is formed of a steel material, the separating piston 24 of the present invention is formed largely or preferably completely of a plastic material. The separating piston 24 overall can be formed from a plastic injection molding, or built up in multiple layers using a conventional extrusion process. Especially good strength values for the separating piston 24 have resulted, if it is built up in this way on its inside and to the outside with a reinforcement of plastic fibers or a plastic membrane applied in the form of a laminate. It has proven especially advantageous to build the separating piston 24 from glass-fiber reinforced polyaryl amide. With this material, the separating piston 24 has essentially the same coefficient of thermal expansion as the steel material from which the cylindrical jacket 12 of the accumulator housing 10 is formed, in addition to the cover parts 14, 16. In the preferred operating or temperature range of the accumulator from approximately 40° C. to 120° C. or higher, the separating piston 24 thus behaves like the steel material surrounding it, with the result that seal problems due to possible temperature fluctuations in the material with different coefficients of thermal expansion are avoided.

As the figures furthermore show, the separating piston 24 borders a cavity 28 which is open in the direction of the gas side 22 of the separating piston 10. In this way, the accumulator capacity for the working gas within the piston-type accumulator can be increased, and accordingly its ability to dampen fluid shocks delivered on the fluid or fluid side 20 of the piston-type accumulator. Furthermore the formation of the cavity 28 reduces the weight of the moving separating piston 24. This weight reduction also benefits the reduction of mass inertia so that the separating piston 24 of the present invention can be triggered very rapidly into its dynamic behavior. Especially, its direction of motion in the accumulator housing 10 can be immediately reversed depending on the operating state.

Within the cavity 28, stiffening crosspieces 30 extend diametrically to the longitudinal axis 26 of the accumulator housing 10, and extend from the axis to the cylindrical inside wall 32 of the separating piston 24, which wall laterally borders the cavity 28. As a result of this stiffening by the stiffening crosspieces 30, the separating piston 24 can be made very light in terms of its weight, and is still designed to have high strength for processing tasks. The aforementioned glass fiber reinforcement also contributes to this high strength. For the two embodiments shown in FIGS. 2 and 3, there are a total of six stiffening crosspieces 30 which can also be accordingly increased or decreased in number depending on the forces which occur. In the embodiment shown in FIGS. 1 and 2, the ends of the stiffening crosspieces 30 which face away or are remote from the inside wall 32 are coupled to a cylindrical receiving ring 34 within the separating piston 24. This structure leads to an increase in the stiffness of the overall system, since the free path length of the stiffening crosspieces 30 on which they could collapse under load is reduced accordingly. For purposes of a lightweight construction, the receiving ring 34 has a middle cylindrical recess 36 extending coaxially to the longitudinal axis 26 of the accumulator housing 10 and of the separating piston 24. The stiffening crosspieces 30 are made rectangular in cross section, and extend over the entire height of the cavity 28 so that the outer ring 38 of the separating piston 24 is stiffened over its entire axial length. A bottom part 40 also contributes to this stiffening. Viewed in the axial travel direction, both the stiffening crosspieces 30 and the receiving ring 34 are supported on the end side of the bottom 40.

Furthermore, the separating piston 24, along its outer ring 38 has groove-like recesses 42, 44, and 46. The recesses 42 and 44 are used to hold seals 48, especially formed from a gasket, formed of elastomer material. The interposed recess 46 can be used to hold a guide strip (not shown) to facilitate the longitudinal traveling motion of the separating piston 24 on the inner circumferential side of the cylindrical jacket 12. The guide can also be molded on as a ring. In a special production process, a different material for the guide can also be molded together in the mold. In this way special material, with special sliding properties can be used for the guide.

The modified embodiment shown in FIGS. 3a, 3b corresponds for the most part to the embodiment shown in FIGS. 1 and 2. Instead of the receiving ring 34 with a central middle recess 36, a linkage point member 50 for the stiffening crosspieces 30 extends axially in a star shape from the middle of bottom 40.

While various embodiments have been chosen to illustrate the invention, it will be understood by those skilled in the art that various changes and modifications can be made therein without departing from the scope of the invention as defined in the appended claims.

What is claimed is:

1. A piston accumulator, comprising:
   an accumulator housing having gas and fluid sides therein and having a longitudinal axis;
   a piston axially displaceable within said housing along said longitudinal axis and separating said gas and fluid sides in said housing, said piston being at least largely of plastic material and having a cylindrical inside wall bordering a cavity opening on said gas side of said housing; and
   stiffening crosspieces within said cavity extending diametrically to said longitudinal axis and extending substantially from said longitudinal axis to said inside wall of said piston, said crosspieces having ends remote from said inside wall terminating in one of a cylindrical hollow receiving ring and of an axially extending linkage member extending within said cavity.

2. A piston accumulator according to claim 1 wherein said piston is completely of plastic material.

3. A piston accumulator according to claim 1 wherein said ends of said crosspieces remote from said inside wall terminate in said hollow receiving ring.

4. A piston accumulator according to claim 1 wherein
at least parts of said piston comprise one of an injection molding and an extrusion; and
at least an outer periphery of said piston is reinforced by one of plastic fibers and of a plastic membrane.

5. A piston accumulator according to claim 1 wherein said plastic material comprises glass fiber-reinforced polyaryl amide.

6. A piston accumulator according to claim 3 wherein said stiffening crosspieces are rectangular in cross section, and extend an entire height of said cavity within said piston.

7. A piston accumulator according to claim 1 wherein said stiffening crosspieces are rectangular in cross section, and extend an entire height of said cavity within said piston.

8. A piston accumulator according to claim 1 wherein said piston comprises groove-shaped recesses on an outer circumferential side thereof, each for holding at least one of a guide strip and of a seal.

9. A piston accumulator, comprising:
an accumulator housing having gas and fluid sides therein and having a longitudinal axis;
a piston axially displaceable within said housing along said longitudinal axis and separating said gas and fluid sides in said housing, said piston being at least largely of plastic material and having a cylindrical inside wall bordering a cavity opening on said gas side of said housing; and
stiffening crosspieces within said cavity extending diametrically to said longitudinal axis, extending substantially from said longitudinal axis to said inside wall of said piston, being rectangular in cross section, and extending an entire height of said cavity within said piston.

10. A piston accumulator according to claim 9 wherein said piston is completely of plastic material.

11. A piston accumulator according to claim 9 wherein
at least parts of said piston comprise one of an injection molding and an extrusion; and
at least an outer periphery of said piston is reinforced by one of plastic fibers and of a plastic membrane.

12. A piston accumulator according to claim 9 wherein said plastic material comprises glass fiber-reinforced polyaryl amide.

13. A piston accumulator according to claim 9 wherein said piston comprises groove-shaped recesses on an outer circumferential side thereof, each for holding at least one of a guide strip and of a seal.

* * * * *